Jan. 1, 1935.                C. McCURLEY                 1,985,941
                              TIRE COVER
                       Filed July 17, 1931         3 Sheets-Sheet 1
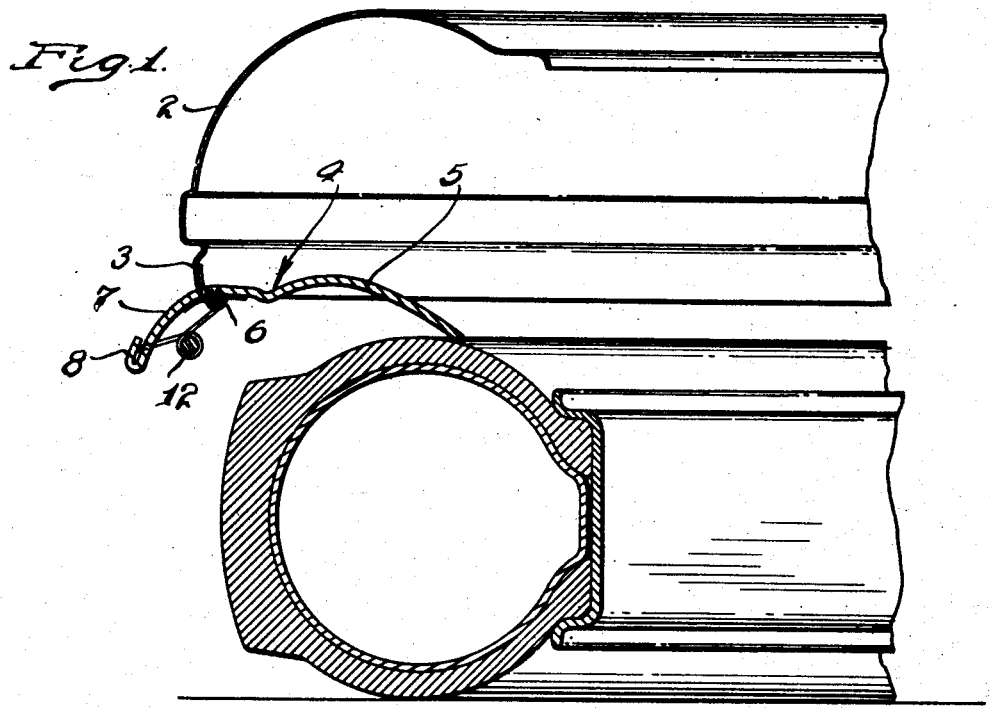
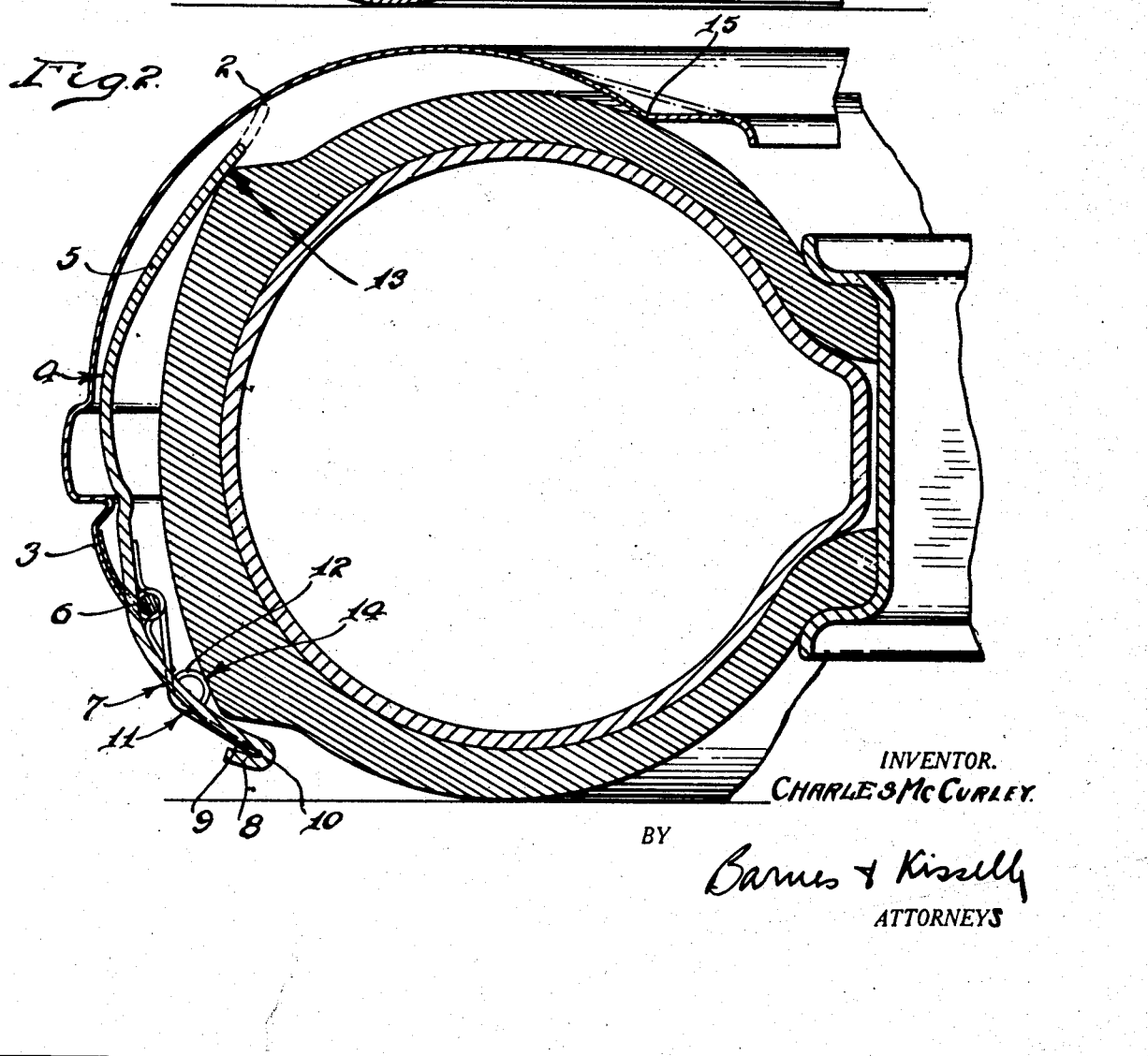
INVENTOR.
CHARLES McCURLEY.
BY
Barnes & Kisselly
ATTORNEYS Jan. 1, 1935. C. McCURLEY 1,985,941
TIRE COVER
Filed July 17, 1931 3 Sheets-Sheet 2
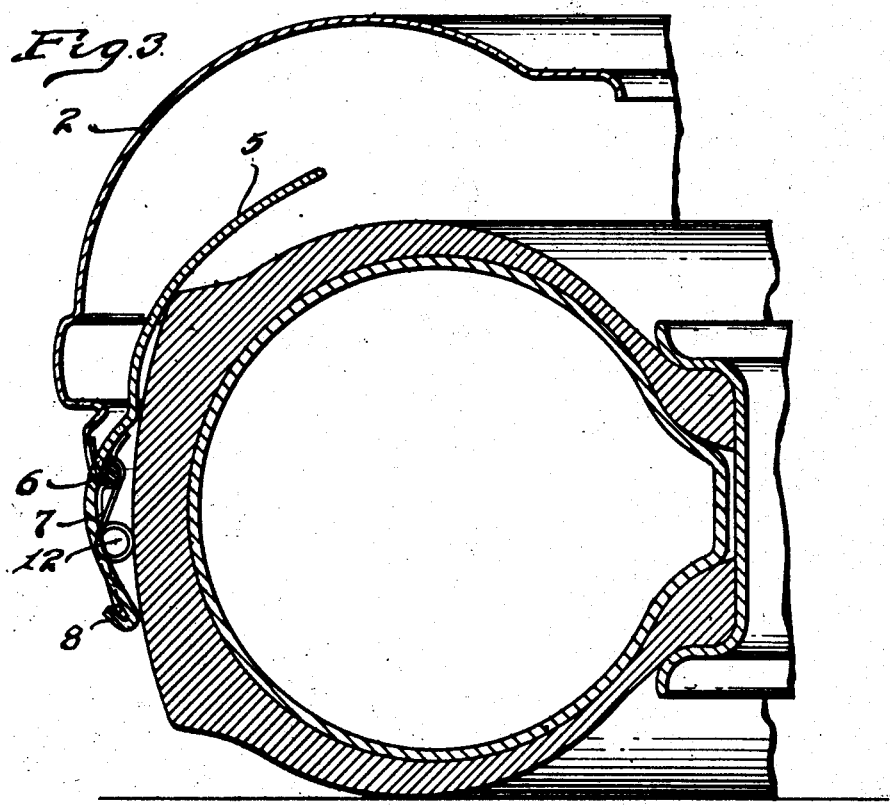
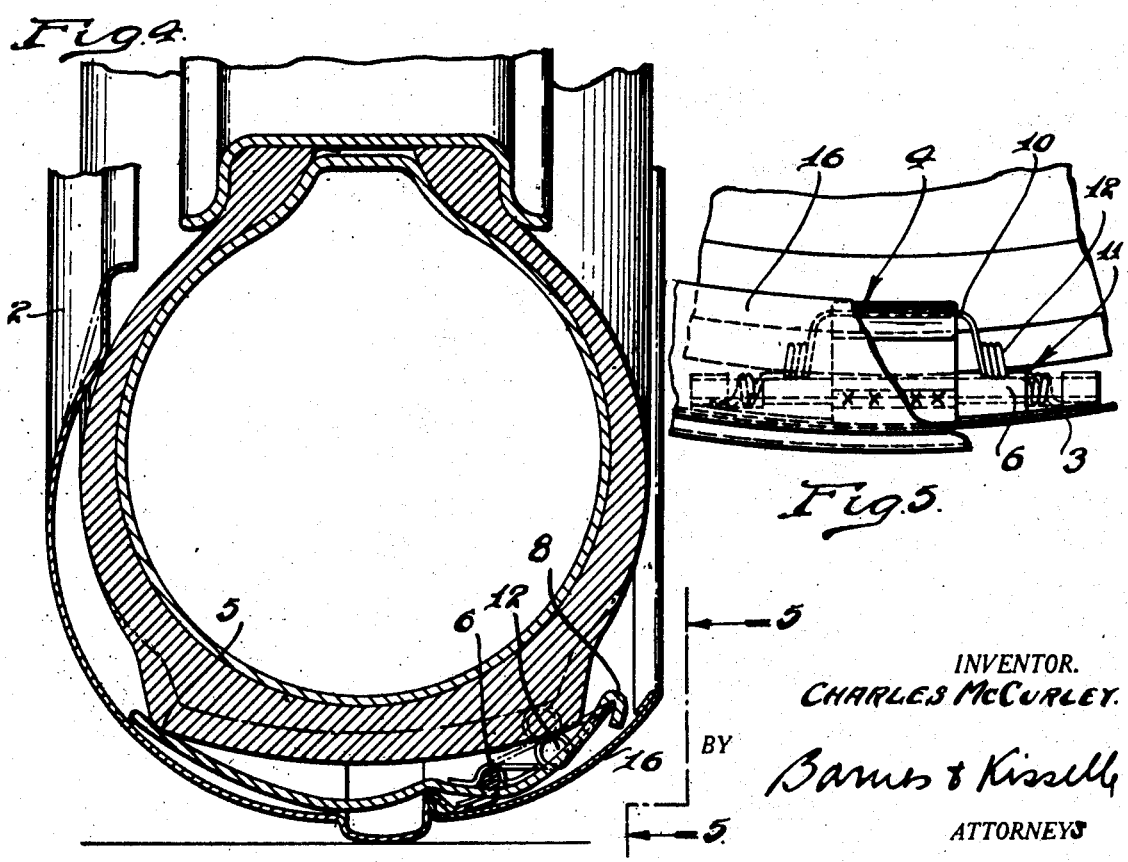
INVENTOR.
CHARLES McCURLEY.
BY
Barnes & Kisselle
ATTORNEYS

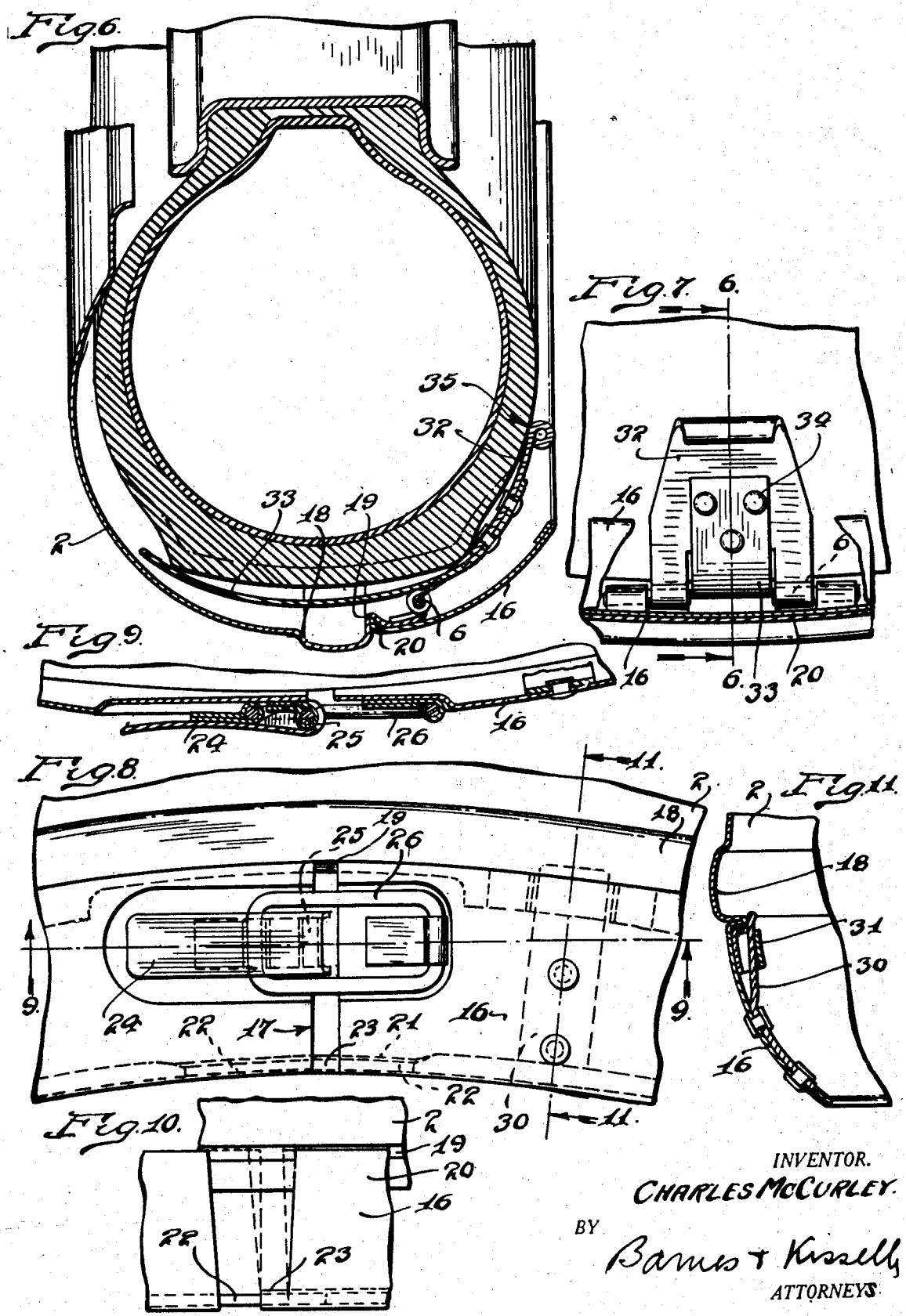

Patented Jan. 1, 1935

1,985,941

UNITED STATES PATENT OFFICE 1,985,941

TIRE COVER

Charles McCurley, Detroit, Mich., assignor to Clayton and Lambert Manufacturing Company, Detroit, Mich., a corporation of Delaware Application July 17, 1931, Serial No. 551,463

15 Claims. (Cl. 150—54)

This invention relates to tire covers, and has to do more particularly with tire covers having a rigid portion covering the face and periphery of the tire.

In the fabrication of metal tire covers, it has recently been the practice to eliminate the metal closure or metal section covering the rear of the tire and to just cover the front and periphery of the tire with a rigid annular one piece cover. In this case, means is usually embodied as a part of the rigid cover for resiliently or detachably engaging the rear surface of the tire for holding the cover in place.

It is the object of the present invention to provide a tire cover of the general outside characteristics as the cover above mentioned with the exception that means is provided, carried by the rigid member, for automatically engaging or releasing the cover as desired. More specifically, the present invention embodies an annular substantially rigid cover, arcuate in cross section, for covering the face, and at least a portion of the periphery of the tire, and attaching means pivotally carried by the cover and so arranged, when the annular cover is held above the tire, as to automatically engage and grasp the tire as the cover is forced into position over the tire. Such automatic clamping means embodies the use of spring members formed as a part thereof whereby the cover may be removed by the application of pressure at a particular point; in this case the pivoted automatic clamping members are so arranged and so operated as to hold the cover snugly in place against rattling, but which means will release the tire cover upon the application of pressure around the periphery thereof.

Other features reside in the extension cover means adapted to be secured to the main rigid cover member, the method of securing the same in place, and the arrangement whereby the automatic clamping means is concealed from view when in clamping position. Still other features reside in the structure and arrangement of the automatic clamping means.

In the drawings:

Fig. 1 is a sectional view illustrating the first step in the applying of my automatic clamping tire cover to the tire.

Fig. 2 is an enlarged sectional view showing the cover in clamping position upon the tire.

Fig. 3 is a sectional view illustrating the manner of removing the cover from the tire.

Fig. 4 is a view similar to Fig. 2 but illustrating the manner of securing an extension cover to the main cover to substantially conceal the automatic clamping device.

Fig. 5 is a fragmentary detailed view taken on line 5—5 of Fig. 4 and illustrating one manner of mounting the take-up spring member.

Fig. 6 is a sectional view of a modified form of the invention wherein the clamping member is provided with a leaf spring instead of the coil spring as shown in Fig. 2.

Fig. 7 is a fragmentary elevation of the leaf spring structure and the manner of securing the clamping unit to the flange of the main cover unit.

Fig. 8 is an enlarged fragmentary view of the latching means for the extension rim.

Fig. 9 is a sectional view taken on line 9—9 of Fig. 8.

Fig. 10 is a fragmentary view showing the split ends of the extension rim in open and closed positions.

Fig. 11 is a sectional view taken on line 11—11 of Fig. 8 and illustrating in section the locating and positioning finger for the extension rim.

The main effective portion of the tire cover of the type illustrated in the drawings is the portion 2 which consists of an annular solid sheet of metal, arcuate in cross section and adapted to cover the face and a portion of the periphery of the tire. It has heretofore been the practice to secure a metal tire cover of this type to the tire by clamping means carried by the cover and adapted to contact with the rear wall of the tire. However, it has heretofore been necessary to manually distort and fold said attaching means over to a position around the periphery of the cover 2 to permit insertion or removal of the tire. This distorting and folding over of the attaching means has of necessity been quite a tedious job.

Instead of using the attaching means which must be manually positioned before and after assembly of the cover to the tire I provide attaching means, which although carried by the tire cover are so pivotally mounted thereto as to automatically position themselves and engage the tire when the tire cover is moved into position over the tire.

The main tire cover is preferably provided with an annular flange 3 and to this flange 3 I preferably mount spaced clamping members 4. Such clamping members 4 preferably consist of a single strip of metal having a portion 5 thereof of greater length relative to the pivot 6 than another portion 7. The shorter arm of this clamping means is preferably turned back as at 8 to provide a slide or groove 9 for receiving the end loop 10 of a coil spring which may be generally designated 11.

This coil spring is preferably looped at the center as at 12 to provide a contacting member for engaging a portion of the tire. By referring to Fig. 5 it will be seen that the coil spring 11 is preferably wrapped around the ends of the pivot member 6 then looped to form the coiled portions 12 and then flattened out to form the portion 10 adapted to engage and ride in the guide 9. In normal position this spring takes the position as best shown in Fig. 1 and in extreme operative position when the tire is new and in full size the position is that substantially shown in Fig. 2.

The long arm 5 of the clamping member is so positioned that when the annular cover member 2 is held over a horizontally positioned tire (see Fig. 1) the clamping members 4 will automatically fall to the position shown. If the clamping member should stick slightly the shaking of the tire cover 2 will move the same into assembly position. The purpose of this position is so that the long leg of the clamping member will first engage the tire and to leave the other point of contact, namely, the loop 12 of the spring away from the tire. As the cover member 2 is lowered to gradually enclose the tire it will be seen that the end of the lever 5 will gradually move around towards the periphery of the tire, the loop 12 likewise moving around towards a position closely adjacent the periphery of the tire. Further movement of the cover towards "home" position will result in the coil 12 contacting with the periphery of the tire whereby the clamping member 4 will have two points of engagement with the tire, one as at 13 in Fig. 2 and the other as at 14 in the same figure. The long arm 5 is preferably resilient so that the clamping action is much more secure and also so that the clamping member may readily adapt itself to different diameters of tires and to the same tire after it is worn. If the operator continues pushing the cover member 2 as far as possible it will of course contact at the point 15, (see Fig. 2) but it is not absolutely necessary that the tire cover contact at this point 15 as the two points of contact 13 and 14 are sufficient to hold the cover in place.

Now, if it is desired to remove the tire cover, it is best to place the cover upon the ground or floor as shown in Fig. 3, and then apply upward pressure to an edge of the tire cover. As the clamping members 4 are positioned around the tire, preferably five in number, they only hold the tire in position by reason of friction, to overcome which requires only a relatively slight pressure to start the displacement of the tire cover 2. It is usually best to grasp the tire cover at one point near one of the clamping members and raise this point first and the cover will come off the tire very easily. In Fig. 2 I have shown the positon the clamping member takes relative to the tire as the clamping member is removed from the tire. It is seen that the member 5 gradually moves around relatively to the edge of the tire so as to make the tension between the clamping member and the tire gradually less.

In order to cover up my automatic clamping means I preferably provide a cover extension member 16 as best shown in Figs. 4 to 11. This cover extension is preferably arcuate in cross section and annular in shape, the ends thereof being normally spaced apart as shown at 17 in Fig. 8 so as to provide an expansible and a contractible split rim. The main tire cover 2 is preferably provided with a bead 18 and a small bead or channel 19 for receiving an in-turned flange 20 of the extension cover 16.

The outer edges of the extension rim 16 adjacent the split portion are preferably turned over as at 21 and one of said ends is provided with a rod or plunger 22 which fits within the curled up edge of the other end. One of the ends is also provided with an enlarged head 23 so as to form a stop when the same abuts the edge of the other end of the rim member. A lever 24 is pivoted as at 25 to one end of the rim member and is connected by a link 26 to the other end of the rim member. By actuating such lever 25 about the pivot 26 it will be seen that the rim member is expanded or contracted and inasmuch as the outer edge of the rim member is stopped by the member 23 the inner edges of the rim member 16 will be contracted slightly more than the outer edges so that the flange 20 will be given slightly more expansion and contraction than the outer edge of the rim member 16 so as to facilitate its assembly and removal.

One or more fingers 30 may be secured to the rim 16 and may be so positioned as to engage suitable apertured members 31 carried by the main cover 2. These fingers assist in initially positioning the extension cover during assembly.

In the modified structure shown in Figs. 6 and 7 the clamping member consists of a bifurcated spring member 32, the end of which may be curled around the pivot 6. This bifurcated spring member 32 forms a short leg of the clamping member. The long leg of the clamping member may be designated 33 and is preferably secured to the short leg by means of suitable rivets 34. In this case the resiliency is not only inherent in the clamping member but also takes place around the pivot 6, although such pivot 6 acts as a pivot for the entire clamping member in exactly the same manner as illustrated and described in connection with Fig. 1. In this case the short leg of the clamping member is in contact with the tire at the point 35 which is on the back face thereof instead of on the periphery, although in many cases there may be a three-point contact between the clamping member and the tire as best illustrated in the solid lines in Fig. 6.

What I claim is:

1. A tire cover comprising a substantially rigid member for covering the face of the tire and clamping means carried by said member and so shaped and positioned as to automatically engage the tread portion of the tire as the cover is moved toward tire enclosing position and then automatically engage the tread portion at two points and clamp the cover in position as the cover is moved "home" into final position.

2. A tire cover comprising an integral substantially rigid member annular in shape and arcuate in cross-section for covering the face and at least a portion of the periphery of the tire, and means pivotally carried by said member and movable transversely of and engaging the tire at two distinct and spaced points for holding said member in position, said pivot being parallel to the plane of the cover.

3. A tire cover comprising an integral substantially rigid member annular in shape and arcuate in cross section, for covering the face and at least a portion of the periphery of the tire, and clamping means carried by and bodily movable relative to said rigid member, each clamping means having a resilient portion extending within the rigid member and positioned to be automatically distorted by a portion of the tire, as the rigid member is moved to tire enclosing position, said distorted portion assisting in frictionally holding the member in tire engaging position.

4. A tire cover comprising an integral substantially rigid member annular in shape and arcuate in cross-section for covering the face of the tire, and means fixedly and pivotally carried by said member and movable about said pivot for engaging the tire at two points for holding said member in position, said pivot being parallel to the plane of the cover.

5. A tire cover comprising a metallic main cover member for covering the face of the tire, and clamping means pivotally carried by said cover, said clamping means being resilient and adapted to engage the tire at a plurality of points.

6. A tire cover comprising a metallic main cover member for covering the face of the tire, and clamping means carried by and having a portion extending within said cover, each clamping means being resilient and adapted to engage the tire at a plurality of points, said clamping means and the points of engagement between the same and the tire serving as the sole means for holding the cover on the tire.

7. A tire cover comprising a metallic main cover member for covering the face of the tire, and clamping means bodily movable relative to and carried by and having a portion extending within said cover, each clamping means being resilient and adapted to engage the tire at a plurality of points, and an extension cover complementally engaging the said main cover for substantially concealing said clamping means.

8. A tire cover comprising a main rigid cover member for covering the face of the tire and spaced clamping means carried thereby, said clamping means being of such length and shape relative to the tread of the tire so as to engage the tire at transversely spaced points on the periphery thereof.

9. A tire cover comprising a main rigid cover member for covering the face of the tire and spaced clamping means carried thereby, each clamping means engaging the tire only at traversely spaced points on the periphery thereof, each clamping means being resilient to adapt itself to different sizes of tires.

10. A tire cover comprising a main cover member for covering the face of the tire and a plurality of clamping members carried by and spaced around the periphery of said cover member, said clamping members being so formed, connected and bodily movable relative to said cover member as to assume substantially a horizontal position when the cover member is held in a horizontal position, said clamping member being so positioned and shaped that one part thereof contacts with the tire as the cover is moved towards enclosing position around the tire, and another part contacts with another part of the tire as the cover member is moved "home."

11. A tire cover comprising a main cover member for covering the face of the tire and a plurality of clamping members carried by and spaced around the periphery of said cover member, said clamping members being so formed and connected to said cover member as to assume substantially a horizontal position when the cover member is held in a horizontal position, said clamping member being so positioned and shaped that one part thereof contacts with the tire as the cover is moved towards enclosing position around the tire, and another part contacts with another part of the tire as the cover member is moved "home", said clamping members holding the cover in position but being readily disengaged from the tire by the application of pressure to the cover.

12. A tire cover comprising a main annular cover member for the face of the tire, bodily movable clamping members carried by said cover member and shaped to contact with the tire at a plurality of transverse points, and a split extension cover member cooperating with said main cover member for substantially concealing the said clamping members and means for expanding and contracting said extension member whereby the inner edge thereof cooperating with the main cover member is expanded and contracted to a greater extent than the outer edge.

13. A tire cover comprising a substantially rigid member for covering the face of the tire, and clamping means so carried by said member and so shaped as to bodily assume one position relative to the cover when the cover is held over a tire and automatically assuming another position to cause said clamping means to engage the tread of the tire as the cover is axially moved towards tire enclosing position.

14. A tire cover comprising a substantially rigid member, annular in shape but arcuate in cross section, for covering a face and at least a portion of the periphery of the tire, and clamping means carried by said member and so shaped and positioned as to automatically engage the tread portion of the tire as the cover is moved towards tire enclosing position and then automatically clamp the cover in position for frictional contact with the tread of the tire as the cover is moved "home" into final position, said clamping means being bodily and automatically movable to at least two different positions relative to the cover before and after assembly of the cover on the tire.

15. A tire cover comprising a substantially rigid member for covering the face of the tire, and clamping means carried by and circumferentially positioned around the member, said clamping means being so mounted on said member as to be bodily movable relative thereto, the greater portion of each clamping means being positioned to one side of said point of mounting to the rigid member whereby this greater portion will contact with the side of the tire as the rigid member is moved toward tire enclosing position and to automatically cause the portion of each clamping means on the other side of said mounting point to move around the tread of the tire into clamping position.

CHARLES McCURLEY.